US008611195B2

(12) United States Patent
Kuijper et al.

(10) Patent No.: US 8,611,195 B2
(45) Date of Patent: Dec. 17, 2013

(54) DETECTION OF DATA IN BURST CUTTING AREA OF OPTICAL DISK

(75) Inventors: Maarten Kuijper, Eindhoven (NL); Bart Van Rompaey, Eindhoven (BE); Jacobus Petrus Josephus Heemskerk, Eindhoven (NL); Cornelis Marinus Schep, Eindhoven (NL); Josephus Arnoldus Henricus Maria Kahlman, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 58 days.

(21) Appl. No.: 12/964,140

(22) Filed: Dec. 9, 2010

(65) Prior Publication Data
US 2011/0075533 A1    Mar. 31, 2011

Related U.S. Application Data

(62) Division of application No. 10/579,873, filed as application No. PCT/IB2004/052463 on May 18, 2006, now Pat. No. 7,872,953.

(30) Foreign Application Priority Data

Nov. 21, 2003    (EP) .................... 03104304

(51) Int. Cl.
*G11B 15/52*    (2006.01)
(52) U.S. Cl.
USPC .................... 369/47.17; 369/59.23; 369/53.2
(58) Field of Classification Search
None
See application file for complete search history.

(56) References Cited

U.S. PATENT DOCUMENTS

| | | |
|---|---|---|
| 5,706,047 A | 1/1998 | Lentz et al. |
| 5,732,066 A | 3/1998 | Moriya et al. |
| 6,034,937 A | 3/2000 | Kumagai |
| 6,081,785 A | 6/2000 | Oshima et al. |
| 6,496,541 B1 | 12/2002 | Kahlman et al. |
| 6,654,425 B1 | 11/2003 | Kunisa et al. |
| 6,731,228 B2 | 5/2004 | Suh et al. |
| 6,973,015 B1 | 12/2005 | Murakami et al. |

(Continued)

FOREIGN PATENT DOCUMENTS

| | | |
|---|---|---|
| CN | 1379394 A | 11/2002 |
| EP | 0802527 A | 10/1997 |

(Continued)

OTHER PUBLICATIONS

Kees Schep et al, "Format Description and Evaluation of the 22.5 GB Digital-Video-Recording Disc", Jpn. J. Appl. Phys. vol. 40, 2001, pp. 1813-1816.

(Continued)

*Primary Examiner* — Paul Huber

(57) ABSTRACT

An apparatus generates outgoing data (OD) to be provided on an optical disk (1) in a burst cutting area (2). The burst cutting area (2) further comprises markings (3) which cause a marking frequency spectrum (MFS) when reading out the burst cutting area (2). The apparatus comprises a channel coder (4) which receives processed data (PD) and supplies the outgoing data (OD) having an outgoing data frequency spectrum (DFS) with suppressed DC-content. The apparatus further comprises a data processing device (5) which generates the processed data (PD) to obtain an outgoing frequency spectrum (DFS) wherein a frequency component causing interference with a low frequent component of the markings (3) is suppressed or not present.

17 Claims, 3 Drawing Sheets

(56) References Cited

U.S. PATENT DOCUMENTS

| | | | |
|---|---|---|---|
| 7,218,262 | B2 | 5/2007 | Hayami |
| 2002/0073038 | A1 | 6/2002 | Oshima et al. |
| 2003/0137913 | A1 | 7/2003 | Oshima et al. |
| 2007/0127352 | A1* | 6/2007 | Oshima et al. ............. 369/275.1 |
| 2008/0310292 | A1* | 12/2008 | Nagai et al. ................ 369/275.3 |
| 2011/0286315 | A1 | 11/2011 | Gotoh et al. |

FOREIGN PATENT DOCUMENTS

| | | |
|---|---|---|
| EP | 0807929 B1 | 2/2001 |
| EP | 1120777 A2 | 8/2001 |
| EP | 1178472 A2 | 2/2002 |
| JP | 20049873 A | 2/1998 |
| JP | 2002280907 A | 9/2002 |
| JP | 200387122 A | 3/2003 |
| JP | 2003173631 A | 6/2003 |
| JP | 200325787 A | 9/2003 |
| WO | 9817005 A1 | 4/1998 |
| WO | 03061139 A2 | 7/2003 |
| WO | 03069609 A2 | 8/2003 |

OTHER PUBLICATIONS

Kees S. Schouhamer Immink, "EFMPlus: The Coding format of the Multimedia Compact Disc", IEEE Transactions on Consumer Electronics, vol. 41, No. 3, Aug. 1, 1995, pp. 491-497.

Yong Hoon Kang, "Angular and Speckle Multiplexing of Photorefractive Holograms by use of Fiber Speckle Pattern", Applied Optics vol. 37, No. 29, Oct. 10, 1998, pp. 6969-6972.

Tatsuya Narahara et al, "Optical Disc System for Digital Video Recording", Jpn. J. Appl. Phys. vol. 39, 2000, pp. 912-919.

* cited by examiner

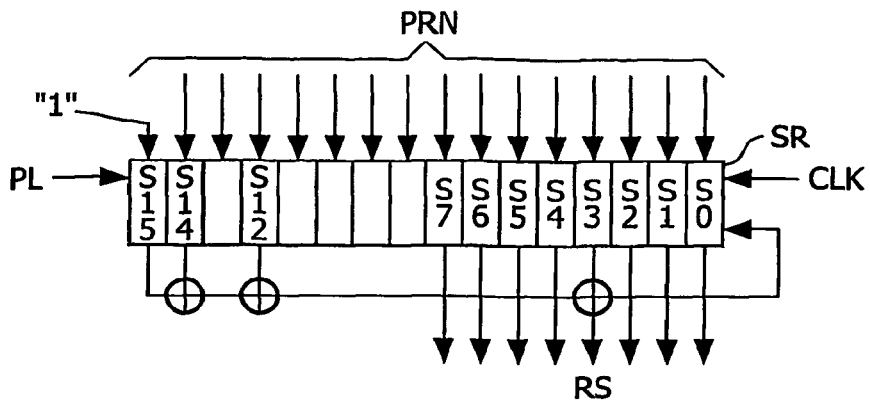
FIG. 6
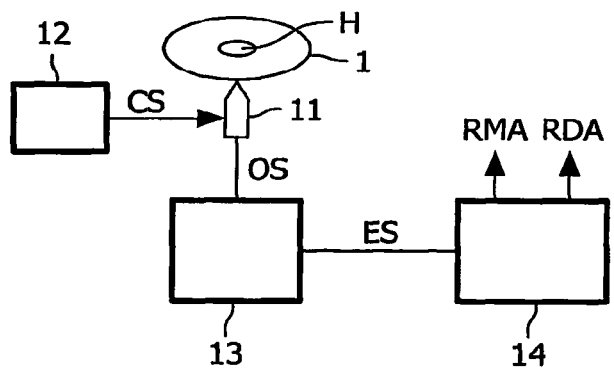
FIG. 7
| B0 | | | | B1 | | ... | B12 | | B13 | |
|----|----|----|------|----|------|-----|-----|-------|-----|-------|
| FS | LI | D0 | DCC0 | D1 | DCC1 | | D12 | DCC12 | D13 | DCC13 |
| 10 | 4  | 31 | 1    | 45 | 1    | | 45  | 1     | 45  | 1     |
FIG. 8

DETECTION OF DATA IN BURST CUTTING AREA OF OPTICAL DISK

This is a divisional of prior application Ser. No. 10/579,873 filed May 18, 2006 and is incorporated by reference herein.

FIELD OF THE INVENTION

The invention relates to an apparatus for generating outgoing data to be provided on an optical disk, to a method of creating outgoing data to be provided on an optical disk, to an optical disk comprising data in the burst cutting area, to an apparatus for manufacturing such an optical disk, to an apparatus for reading an optical disk, and to a method of reading an optical disk.

BACKGROUND OF THE INVENTION

EP-A-1120777 discloses an optical disk with an embossed data zone which has pits and projections indicating data signals which are readable by light irradiation. A barcode pattern which indicates information is formed on the embossed data zone with a laser. To prevent copying of disk information, on a ROM-disk, physical markings are randomly formed. During the read out of the disk, the position of these physical markings is determined and compared with position information which is encrypted in the barcode. The position where the physical markings should occur is stored as a secret key in the encrypted barcode. The disk ID and the position information, which is different for different disks, are combined and encrypted together with a digital signature. Thus by comparing the actual position of the markings on the disk with the decrypted positions of the marking indicated by the barcode it is possible to determine whether the disk is a copy or not.

Both the markings and the barcode may be present in the burst cutting area, which usually is referred to as the BCA. The barcode stripes are written into the same layer as the data pits. At the reproduction apparatus, the barcode stripes are distinguished with respect to the data pits which are present in-between the barcode stripes. At the non-reflective barcode stripes, the missing portions produce a low level signal which is different from a signal generated from an ordinary data pit. A slicer is used to detect this low level. From the detected low level portions of the signal, a PWM modulator demodulates the signal containing the encrypted information.

It is a drawback that the signal generated from the data pits may disturb the correct slicing of the barcode data.

SUMMARY OF THE INVENTION

It is an object of the invention to decrease the influence of the data pits on the reading of the barcode data.

A first aspect of the invention provides an apparatus for generating outgoing data to be provided on an optical disk. A second aspect of the invention provides a method of creating outgoing data to be provided on an optical disk. A third aspect of the invention provides an optical disk comprising data in the burst cutting area. A fourth aspect of the invention provides an apparatus for manufacturing an optical disc with a burst cutting area. A fifth aspect of the invention provides an apparatus for reading an optical disk having a burst cutting area. A sixth aspect of the invention provides a method of reading an optical disk having a burst cutting area.

The apparatus in accordance with the first aspect of the invention provides data to be provided in the BCA on an optical disk. This data may be written on a master which is used to create a large number of read only disks. The data may also be used to be written on a write once or a re-writable disk. The BCA further comprises markings. These markings are readable with the human eye or with a special apparatus. Preferably, the markings comprise a bar-code which indicates a unique code. The dimensions of the markings are larger than the dimensions of the data pits. As is generally known, a channel encoder is used to provide the data on the disk with suppressed DC content. It is further known to retrieve the markings by slicing a low-pass filtered read signal. However, the detection of the markings in this manner is not always reliable.

In accordance with the invention, a data processing device is added which processes the data supplied to the channel encoder such that the low frequent components of the data have less or no interference with the low frequent component of the markings. Now, the low frequency content in the read signal of the data further decreases and the reliability of the detection of the markings is improved. Many possibilities exist to suppress the low frequent components of the data frequency spectrum which may cause an interference with the low frequent components of the marking frequency spectrum.

For example, the frequency components in the outgoing signal of all possible sequences of codes at the input of the channel encoder can be determined. Only those sequences of input codes which produce frequency components not interfering with the retrieval of the markings from the read signal are used to code the data. This is however a cumbersome process.

In a more preferable embodiment, the data processing device and the channel encoder generate the outgoing data having at least a first and a second predetermined repetition frequency when reading out the BCA. The first and the second predetermined repetition frequency are both selected to not coincident with the low frequent component of the barcode frequency spectrum. The low frequent component of the barcode frequency spectrum can be filtered with a band-pass filter if this low frequent component lies in-between the first and second frequencies. If the first and second frequencies are selected higher than the low frequent component a low pass filter suffices. The different frequencies of the data allow encoding data in the BCA. For example, the data may provide an address such that a player knows where on the disk it is reading. However, if the same frequency is used in adjacent tracks, it is not possible to perform a reliable tracking.

In another embodiment, the data processing device supplies data of which the amplitude of the frequency components below a predetermined frequency are substantially smaller than an amplitude of the frequency components above the predetermined frequency. The predetermined frequency is selected above the ground frequency of the markings. The data may have an arbitrary sequence enabling a reliable tracking. The reliable tracking in the BCA may be obtained by using random data. The random data may also be pseudo random data. The random data may comprise a deterministic part which for example indicates the address or a layer number. If a specific layer number is used in the BCA, the detection of this layer number may be used to determine whether information is read in the RCA.

In yet another embodiment, the data processing device comprises a pre-coder for pre-coding incoming data by replacing data sequences of the incoming data by data sequences of pre-coded data. The outgoing data comprises the data sequences of the pre-coded data having a smaller low frequent content than the corresponding data sequences of the incoming data, a number of bits of a data sequence of the pre-coded data being larger than a number of bits of a corresponding data sequence of the incoming data. The incoming data may be random data if tracking only is relevant. This random data may comprise a deterministic part comprising an address or layer number if it further important to know where the reading of the information from the disk is actually taking place. The incoming data may also be user data. By allowing user data to be written in the BCA the capacity of the disk is increased. The data written in accordance with the invention has suppressed low frequencies to minimally interfere with the markings. However, the conversion of the data to the higher frequencies lowers the data capacity. But, this is not a problem because this only occurs in the BCA.

In another embodiment, the data processing device is arranged for converting incoming data to obtain the processed data representing the incoming data and having a data frequency spectrum wherein a frequency component interfering with a low frequent component of the bar code stripes is suppressed or not present. In another embodiment, the apparatus further comprises a random data generator for generating random data as the incoming data.

In another embodiment, the markings comprise a barcode. The barcode is a unique identification of the disk which, for example can be used for copy protection. Preferably, the markings are provided with a laser such that they cannot be removed by a user. The markings may be any other marking than barcodes. For example, letters and numbers may be used. The pitch of the markings should be larger than the pitch of the data to be able to provide the data with frequency components higher than the low frequency components of the markings. The pitch of the data is usually defined by the data pits.

In another embodiment, the pre-encoder codes the data sequences 00, 01, 10, 11 of the incoming data into the respective corresponding data sequences 1010, 0001, 0111, 0101 of the pre-coded data. Although the doubling of the data halves the data capacity, the low frequency content is decreased and the detection of the markings is improved.

In another embodiment, the pre-encoder codes the data sequence 10 10 of the incoming data into the corresponding data sequence 0000 1000 of the pre-coded data. This decreases the DC content of the outgoing signal.

In another embodiment, the channel encoder is a well known 1,7 PP encoder. Such an encoder disclosed in PHQ98.023 and the not yet public System description Blu-ray Disc Rewritable format, part 1, Basic Format Specifications, Version 1.01, July 2003 (further referred to as the Blu-ray disc specification), and serves to minimize the DC content of the data on the disk.

In another embodiment, the input data is given a format such that after pre-encoding a standard data frame is obtained. With a standard data frame is meant a data frame which has the same format as a data frame in the user area outside the BCA. This has the advantage that the same channel-encoder can be used inside the BCA as already present for the data outside the BCA.

In another embodiment, the 1,7PP encoder is controlled to provide a frame sync signature which is mown from the Blu-ray disc specification as FS7. This frame sync signature is not used in the user data area outside the BCA and it's repeatedly occurrence is thus indicative for the BCA. Further, this frame sync signature causes minimal low frequency interferences.

These and other aspects of the invention are apparent from and will be elucidated with reference to the embodiments described hereinafter.

BRIEF DESCRIPTION OF THE DRAWINGS

In the drawings:
FIG. 6 shows a pseudo random generator,
FIG. 7 shows an apparatus for reading the optical disk,
and
FIG. 8 shows a preferred input data frame.

DETAILED DESCRIPTION OF THE PREFERRED EMBODIMENT

The same references in different Figures refer to the same items.

Figure 1:
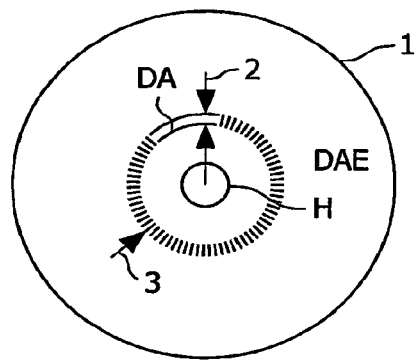
FIG. 1 shows a top view of an optical disc with a burst cutting area in which markings are present.

FIG. 1 shows a top view of an optical disk with a burst cutting area in which markings are present. The optical disk 1 comprises a spindle hole H for centering the disk 1 when it is written or read. The optical disk 1 can be of any kind, for example, the optical disk 1 is a CD, a DVD, a SACD or a Blu-ray disk. A Blu-ray disk is an optical disk 1 with a relatively high data density and which can be read with a blue laser which has a relatively short wavelength. The optical disk 1 may be a read-only disk, a recordable (write-once) disk or a rewritable disk. The writing and reading of the disk is performed with a laser. Usually, the writing on a read-only disk is performed much more efficient by stamping the disk.

The disk 1 has a user data area DAE and a burst cutting area 2 further also referred to as BCA 2. The user data area DAE is the area between the outer border of the BCA 2 and the outer border of the disk 1. The BCA 2 comprises markings 3 and data DA. The markings 3 may form a barcode. The data DA may be present in an area in-between the start and the end of the barcode, but also in-between stripes of the barcode. The data may be present the enable DPD (Differential Phase Detection, a generally known term, see, for example, Applied Optics Vol. 37, No. 29, 10 Oct. 1998) tracking, to provide a master run-in area, or to provide address information indicating the actual track. In older formats, like DVD-ROM, embossed pits can be present in the BCA 2. During read out of the markings 3 in the BCA 2, the read out signal contains information on the pits and on the markings 3. The frequency components in the read signal which are caused by the markings 3 are referred to as the markings frequency components. These markings frequency components form the markings frequency spectrum. The frequency components in the read signal which are caused by the pits are referred to as the data frequency components. These data frequency components form the data frequency spectrum.

Usually, the markings 3 are recovered from the read signal by first low-pass filtering the read signal and then slicing the low-pass filtered signal with an appropriate level. However, the pits deteriorate the read out quality of the markings 3 in the BCA 2. Especially the low frequency components of the data frequency spectrum of the pits interfere with the marking frequency components of the marking frequency spectrum. Even a sharp low-pass filter with a cut-off frequency just above the ground frequency component of the markings 3 is not always able to create sufficient margins for an error free detection of the markings 3 in the read signal with the slicer because in some cases the low frequency content of the data frequency spectrum results in similar signal levels as the markings 3. Omitting the data pits in the BCA 2 as disclosed in U.S. Pat. No. 5,706,047 is not preferred because then the tracking, master run-in, or addressing is not possible anymore.

The present invention is directed to the deliberate use of data in the BCA 2 wherein this data is selected such that its data frequency spectrum minimally interferes with the low-frequent components of the markings frequency spectrum of the markings 3. Consequently, the markings 3 can be retrieved with a high reliability. Also, the data can be separated from the markings 3 to allow its use for tracking, master run-in or addressing.

If the data is used for addressing, it should contain meaningful information. If the data is used for tracking or master run-in, the data need not contain meaningful information. In the latter case, the data may be random or pseudo random. Random data ensures that the data of adjacent tracks on the disk 1 is different such that the tracking mechanism is able to distinguish adjacent tracks.

Figure 2:
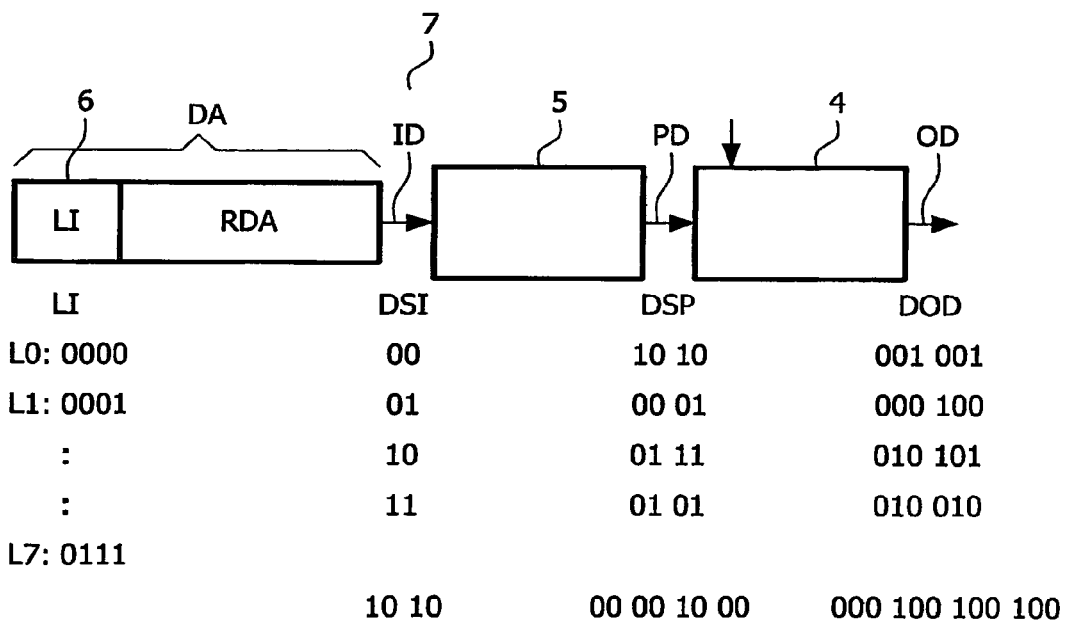
FIG. 2 shows a block diagram of an apparatus which generates outgoing data to be provided on an optical disk.

FIG. 2 shows a block diagram of an apparatus which generates outgoing data to be provided on an optical disk. The apparatus 7 comprises an input data generator 6, a pre-coder 5 and a channel encoder 4. FIG. 2 further shows a table indicating the different possible bit sequences for the layer indication LI. FIG. 2 further shows a table indicating the conversion of bit sequences DSI of the input data ID to bit sequences DSP of the processed data PD, and of the bit sequences DSP to the bit sequences DOD of the outgoing signal OD.

It should be noted that in the embodiments in accordance with the invention as described in the now following a specific well know recording frame of data is written on the optical disk 1 by a specific well known channel encoder 4 for use with optical disks 1. The use of this specific recording frame of data and the specific channel encoder 4 is not essential to the invention and is used solely to explain the operation of the invention. As said before, the essence of the invention is to minimize the interference between the data frequency components and the markings frequency components in the burst cutting area 2 by selecting the data DA in an appropriate manner. If another recording frame of data, and/or another channel encoder 4 is used, the characteristics of the data DA have to be changed such that after conversion of the data DA to the recording frame and after the channel encoding an outgoing signal OD is obtained in which the data frequency components minimally interfere with the markings frequency components. Now, when reading the information from the optical disk 1, a retrieval of the markings 3 is minimally disturbed by the data DA present in the same area 2 as the markings 3.

The well known recording frame of data as proposed for use in the blu-ray disk rewritable format (see the Blu-ray Disc Specification, paragraph 4.12) comprises 1288 bits and starts with a Frame Sync of 20 bits which is converted into a special sequence of 30 modulation/Channel bits. Next, each group of 45 data bits is completed with one additional bit to perform a dc-control block. The recording frame comprises 1240 bits or 155 bytes data. Such a recording frame is constructed to write the data to the disk 1 in the user data area DAE.

The channel encoder 4 converts the user data into outgoing data OD suitable to be written on the optical disk 1. More precisely defined, all the bits of the recording frame except the Frame Sync are converted to modulation or channel bits which together form the outgoing data OD. The user data is converted to a Non Return to Zero Integrated (NRZI) channel bit stream which is recorded on the optical disk 1. As usual, a one in the bit stream indicates a transition in the recorded signal. Such a channel encoder 4 suppresses the DC-content of the user data such that the outgoing data OD has a low running digital sum (further referred to as RDS). Further, the channel encoder 4 limits the maximum and minimum numbers of zero's between two successive one's to limit the maximum and minimum frequency of the read signal.

The well known channel encoder 4 may be the 1,7PP encoder as proposed for use in the Blu-ray disk rewritable format (see the Blu-ray Disc Specification, paragraph 4.14). Now, all the bits of the recording frame except the Frame Sync are converted to modulation or channel bits according to the 1,7PP modulation code. This is an RLL(1,7) (Run Length Limited) code with run-lengths ranging from 2T to 8T. This channel encoder 4 limits the minimum number of zero's between two successive one's to one and the maximum number of zero's between two successive one's to seven. See FIG. 4.20 of the Blu-ray Disc specification.

It has to be noted that the recording frame (more generally also referred to as frame) and the channel encoder 4 are used to convert the user data into data OD written on the optical disk 1 in the user data area DAE. Preferably, the same channel encoder 4 is used to encode the data DA which is written in the BCA 2. This has the advantage that it is not required to implement a special separate encoding and decoding for the data DA in the BCA 2, if this data DA is meaningful. However, alternatively, it is possible to use another encoder for the data in the BCA 2 than for the user data in the user data area DAE. The data DA written in the BCA 2 may be user data, but this is not preferred as the markings 3 may disturb the data DA when read from the disk 1.

The pre-coder 5 converts the incoming data ID to the processed data PD supplied to the channel encoder 4. The pre-coder 5 processes the incoming data ID such that the frequency components of the outgoing data OD (which might interfere with the frequency components of the markings 3 are suppressed or removed. Usually, it suffices to suppress the low-frequent components of the incoming data ID which interfere with the ground frequency component of the markings 3.

Figure 5:
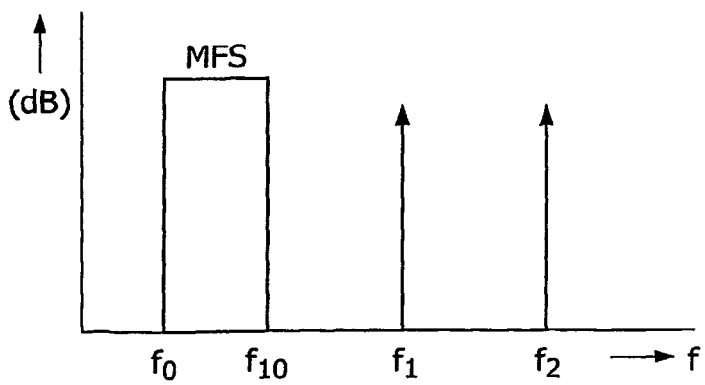
FIG. 5 shows the frequency spectrums of another embodiment in accordance with the invention.

In one embodiment in accordance with the invention, see also FIG. 5, the pre-coder provides the processed data PD such that the outgoing data OD contains discrete frequencies only. The data DA is coded by the frequencies used. For example, if two frequencies f1, f2 are used, the presence of the first frequency during a predetermined period of time represents a zero, and the presence of the second frequency during a predetermined period of time represents a one. In this manner, it is only possible to provide a low amount of data DA in the BCA 2. But, this need not be a drawback, because the low amount of data may be sufficient to provide address information indicating track positions or a particular layer of the disk 1. For the tracking, the actual information in the data DA is not relevant, as long as the data DA of adjacent tracks is not identical.

In another embodiment in accordance with the invention, the pre-coder 5 substitutes incoming bit sequences DSI in the incoming data ID by appropriate processed bit sequences DSP in the processed data PD to obtain data DA on the disk 1 of which the frequency components interfere less with the frequency components of the markings 3.

In a preferred embodiment, the pre-coder 5 replaces the incoming bit sequences DSI by processed bit sequences DSP in the processed signal PD as shown in the following table.

| DSI, incoming bit sequences | DSP, bit sequence in processed signal | OD, channel bit sequence |
|---|---|---|
| 0 0 | 10 10 | 001 001 |
| 0 1 | 00 01 | 000 100 |
| 1 0 | 01 11 | 010 101 |
| 1 1 | 01 01 | 010 010 |
| 10 10 | 00 00 10 00 | 000 100 100 100 |

As is clear from the preceding table, the bit sequences DSI: 00, 01, 10, 11 in the incoming data ID are replaced in the pre-encoder 5 by the processed sequences DSP: 1010, 0001, 0111, 0101, respectively, to obtain the processed data PD. The last column shows the associated channel code, thus the outgoing signal OD of the 1,7PP encoder. The outgoing signal OD, also referred to as outgoing data OD or channel code OD is to be provided on the disk 1. In this channel code OD, the low frequency components are strongly suppressed because each sequence of channel bits OD has a zero running digital sum (RDS). Because the bit sequences of two successive bits in the incoming data ID are converted in sequences DSP of four bits each, the data capacity is halved.

In a preferred embodiment, the sequence 1010 in the incoming data DI is replaced by the sequence 00 00 10 00. Without this replacement, 1010 would be pre-coded into 01 11 01 11 and this would be converted by the 1,7PP encoder 4 into 010 001 000 000. This would increase the running digital sum (RDS) and thus cause a less adequate DC suppression of the channel encoder 4. It should be noted that this last replacement of a particular bit sequence DSI in the incoming data ID further decreases the interference caused by the data DA on the markings 3 when reading out the BCA 2 of the disk 1.

If another channel encoder 4 is used, the skilled person will be able to determine how to replace the input bit sequences DSI into processed bit sequences DSP to obtain at the output of the channel encoder 4 a data frequency spectrum which decreases the disturbance of the retrieval of the markings 3.

FIG. 2 further shows a data generator 6 which generates the input data ID for the pre-encoder 5. In a preferred embodiment, the data generator 6 generates 77.5 bytes data DA. Due to the pre-encoder 5, these 77.5 bytes are converted into 155 bytes data PD. This is exactly the standard amount of data bytes used in the user data area DAE. Thus, again, this allows using the same channel encoder 4 for the user data in the data area DAE and for the data DA in the BCA 2. Consequently, when reading the disk 1, the same decoding is possible for the data in the data area DAE and for the data DA in the BCA 2.

Preferably, the 77.5 bytes of data comprises one nibble for useable information and 77 bytes of arbitrary data RDA. The one nibble preferably provides layer information LI. In the nibble, the layer number LI is encoded which is preferably repeated for each frame in the BCA 2. Because of the high repetition rate of the layer information LI no error correction code need to be applied. Alternatively, it is possible to provide other information in the nibble, such as for example, a track address. The address may be divided over several nibbles, a error correction code may now advantageously be implemented to improve retrievability of the address. It is of course also possible to use more than one nibble for information.

The rest of the data, in this example 77 bytes, may be arbitrary data RDA suitable to ensure the DPD tracking over a long run. Preferably, this arbitrary data RDA is random data. The term random data is meant to include pseudo random data. The random data may be generated with a shift register SR as shown in FIG. 6. The random data RDA may also be generated with a suitable algorithm.

The frame of 77.5 bytes is then pre-processed by the pre-encoder 5, which in this example is a one-to-two encoder, resulting in a data frame of 155 bytes. The one-to-two pre-encoder 5 offers a very simple and efficient method to suppress the low frequent spectrum of the 1,7PP encoded frame. To further reduce low frequency disturbance by the Frame Sync, only the known Frame Sync code FS7 or FS8 is selected out of the many possible frame sync signatures. The Frame Sync signature FS7 is 100101 in non-return to zero (NRZ) code, or (0) 111 001 and (1) 000 110 in NRZI depending on the preceding bit. The Frame Sync signature FS8 is 101010 in non-return to zero (NRZ) code, or (0) 110 011 and (1) 001 100 in NRZI depending on the preceding bit. Further, the repeating occurrence of the Frame Sync code FS7 or FS8 during reading of the disk 1, indicates that the reading occurs in the BCA 2, because this Frame Sync code FS7 and FS8 are only used between successive ECC clusters in the normal user data present in the user data area DAE. The resulting bit stream at the output of the channel encoder 4 is again a correct 1,7PP bit stream comprising 1932 channel bits per recording frame, but with the intended suppressed low frequent part of the spectrum, and with layer-location information encoded in the frame.

Thus, the cross-talk between the markings 3 and the data DA in the BCA 2 is decreased by minimizing interference between the frequency spectrums of the markings 3 and the data DA. In a preferred embodiment wherein the markings 3 are stripes forming a barcode, the stripes in the BCA 2 are separated from the modulated pits, which represent the data DA, in the frequency domain by extensively attenuating the low-frequency content of the channel-code OD for the data DA. A very simple and effective method to achieve this is by adding the pre-coding step at the input of the 1,7PP channel encoder. This does not change the structure of the channel code itself.

In an optimal solution, the requirements put on the separation in the frequency domain of the markings 3 and the data DA in the BCA 2 are listed in the now following. The cross-talk between the pit patterns of the data DA and the markings 3 is suppressed to increase the cutting margins and the detection margins of the markings 3. Useful address or location information is included in the pit patterns. The pit sequence should give rise to non-distorted DPD tracking signals. Non-repetitive sequences are used with sufficient random behavior. Carriers, like 2T's or 8T's, as well as too short random sequences may align between neighboring tracks, and consequently cause distorted DPD signals. If EO (Electro-optical) modulators in LBR's (Laser Beam Recorders) are used, carriers, like 2T's or 8T's cannot be used because DC content will be introduced. The formatter which generates the random pit sequence and the address information is preferably kept as simple as possible. In this optimal solution, a balanced disparity 1,7PP HF (high frequency) signal with layer-number information encoded in each frame is generated. This approach improves the detection of the markings 3 significantly, while location information is encoded in the data DA. Due to the improved separation in the frequency domain of the markings 3 and the data DA in the BCA 2, it is easier to reliably decode the layer information LI from the data DA. The layer information LI is relevant to indicate on which layer the data DA is present if in a multi layer disk, the data DA is present on a particular layer LI only.

It has to be noted that the construction of the pre-encoder depends on the channel encoder used. The pre-encoder should be specifically designed to obtain the suppression of the interference between the data DA and the markings 3 at the output of the channel encoder. Preferably, the channel encoder takes care that a strong suppression is obtained of the low frequencies at the output of the channel encoder independent on the data DA which is pre-processed by the pre-encoder. Preferably, the selection of the data format of the data DA inputted into the pre-encoder is selected such that the channel encoder is a standard channel encoder which is also used for reading the user data from the optical disk or for writing the user data to the disk, outside the BCA. Thus only a pre-encoder has to be added.

Figure 3:
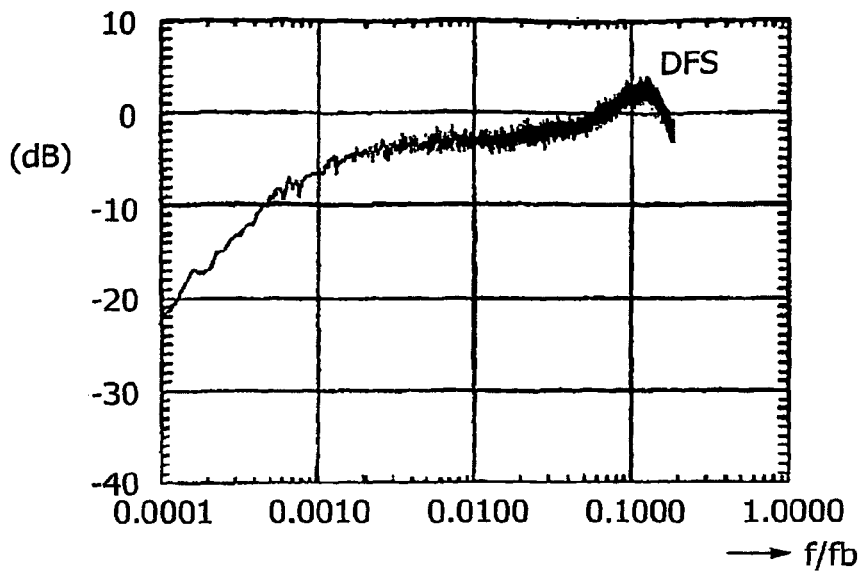
FIG. 3 shows a prior art frequency spectrum of data when read from the optical disk.

FIG. 3 shows a prior art frequency spectrum of data when read from the optical disk. FIG. 3 shows the frequency spectrum DFS of the outgoing data OD if the incoming data ID is random. The vertical axis of FIG. 3 shows the amplitude in dB, the horizontal axis shows the normalized frequency f/fb wherein fb is the channel encoder input bitrate (44 MHz at nominal Blu-Ray speed). This frequency spectrum DFS is representative for the data OD to be provided on the disk 1 in the user data area DAE. The data OD may be stamped in the disk 1 in a well known manner if it is a read-only disk. In all kinds of disks 1, but in particular for recordable and re-writable disks 1, the data OD may be written on the disk 1 by a laser. A similar spectrum will occur when the data is read from the disk 1. The spectrum shown is obtained by using a 1,7PP channel encoder 4 to encode the data OD. It has to be noted that the channel encoder 4 suppresses the DC-content of the data OD.

Figure 4:
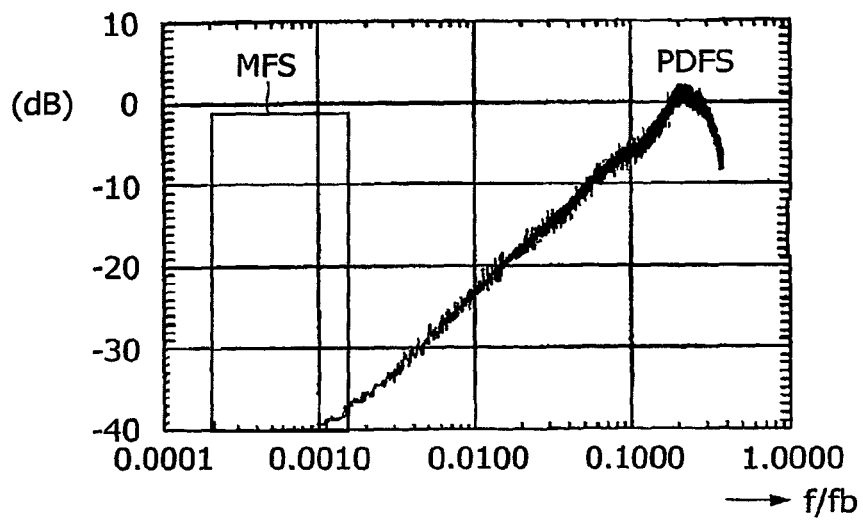
FIG. 4 shows the frequency spectrums of the data and the markings read from the optical disk in accordance with an embodiment of the invention.

FIG. 4 shows the frequency spectrums of the data and the markings read from the optical disk in accordance with an embodiment of the invention. The vertical axis of FIG. 3 shows the amplitude in dB, the horizontal axis shows the normalized frequency. The frequency spectrum MFS of the markings 3 is stylistically indicated by a rectangular. In practice, the markings frequency spectrum MFS may have a more detailed shape which depends on the actual markings 3. The rectangular indicates that the frequency components of the markings 3 are predominantly present at lower frequencies. FIG. 4 further shows the frequency spectrum PDFS of the outgoing data OD when the processed data PD which enters the channel encoder 4 is pre-processed with the pre-encoder 5. With respect to the frequency spectrum DFS shown in FIG. 3, the frequency spectrum PDFS contains substantially less low frequent components. The overlap of the data frequency spectrum PDFS with the markings frequency spectrum MFS is less than that of the data frequency spectrum DFS. Consequently, in the BCA 2 where both data DA and markings 3 are present, the interference of the data DA on the markings 3 when reading the disk 1 will be less due to the use of the pre-encoder 5. A simple low-pass filter will be able to separate the data stream signal and the signal caused by the markings 3 because the data DA will have less influence. The level detection will indicate the markings 3 in the read signal more reliably.

FIG. 5 shows the frequency spectrums of another embodiment in accordance with the invention. In this embodiment, the data frequency components are selected to occur at a predetermined number of discrete frequencies. FIG. 5 shows a stylistic representation of the frequency spectrum MFS of the markings 3. This frequency spectrum has a lowest frequency component fo and a highest component f10. The pre-encoder 5 supplies encoded data such that at the output of the channel encoder only two frequency components f1 or f2 are present. These frequency components f1 and f2 are selected to minimally interfere with the frequency components of the markings 3. Preferably, as shown, the frequency components f1 and f2 are selected above the frequency spectrum MFS of the markings 3. A simple low-pass filter is able to separate the signal caused by the markings 3 from the frequency components f1 and f2 of the data. Alternatively, the frequency components f1 and f2 may be selected in-between frequency components of the markings 3. However, a more complex comb-filter may than be required.

It has to be noted that the frequency spectrum MFS of the markings 3 is shown stylistically only. In practice, this spectrum MFS may show individual frequency components corresponding to the ground frequency of the markings 3 and higher harmonics of this ground frequency. The higher harmonics may extend beyond the highest frequency f10 of the spectrum MFS, but their amplitude is so low that they are not relevant for the reconstruction and detection of the pulses caused by the markings 3 in the read signal.

FIG. 6 shows a pseudo random generator. The pseudo random generator comprises a 16 bit shift register SR storing the bit values s0 to s15 in the memory cells of the shift register 16. The shift register SR has a parallel load input which receives a parallel load signal PL. If the parallel load signal PL indicates that a parallel load is desired a parallel load number PRN which comprises two bytes is clocked into the memory cells. The bit value s15 is always loaded with a one. The (pseudo) random sequence is the output byte RS comprising the bit values s0 to s7. A clock input receives a clock signal CLK to cyclically shift the data in the memory cells. The new bit value s0 is determined as the logical EXOR of the bit values s15, s14, s12, and s3.

The practical implementation of the pseudo random generator is not essential to the invention. Many alternative solutions are known to generate a random or a pseudo random data sequence.

FIG. 7 shows an apparatus for reading the optical disk. The apparatus comprises an optical unit 11, a position control unit 12, a signal reproduction circuit 13, and a processor 14. The disk 1, when loaded in the apparatus, is rotated by a motor via a mechanical catching mechanism (not shown) clamping the disk 1 centered by its spindle hole H.

The position of the optical unit 11 with respect to the disk 1 (often referred to as OPU) is controlled by the position control unit 12. The position control unit 12 supplies control signals Cs to the OPU 11 to jump to a specific track on the disk 1. Preferably, the control unit 12 knows on which track the OPU 11 is actually positioned by reading address information from the track. Once a specific track is found, the position control unit 12 controls the radial position of the OPU 11 to be able to track this track. The position control unit 12 further may control the OPU 11 to focus the laser beam on the desired layer. During a read phase, the signal reproduction circuit 13 receives the optical signals from a read laser from the OPU 11. The signal reproduction circuit 13 converts the optical signals into electrical signals which are processed into read signals ES. The read signals ES may contain the channel data OD defined with respect to FIG. 2. The processor 14 comprises a circuit for separating the frequency components of the markings 3 and the frequency components of the data DA in the BCA 2. If the low-frequent content of the data DA is suppressed as is shown in FIG. 4, this circuit may comprise a low-pass filter and a high pass filter to retrieve the markings 3 and the data DA, respectively. The low-pass filter passes the relevant frequency components of the markings and blocks the high level frequent components of the data DA. The high-pass filter passes the relevant frequency components of the data DA and blocks the high level frequent components of the markings 3.

The markings 3 can be retrieved by slicing the output signal of the low-pass filter. If present, the information in the data DA, can be retrieved by using a decoder which performs the inverse operation of the channel encoder 4 and the pre-coder 5 of FIG. 2. In the user data area DAE, the same decoder which performs the inverse operation of the channel encoder 4 is used to retrieve the user data.

Although not shown in FIG. 7, during a writing phase, the signal reproduction circuit 13 provides the optical signals from a write laser to the OPU 11 during a writing phase. The write signals may be generated in the same manner as the outgoing signal OD of FIG. 2.

FIG. 8 shows a preferred format of the input data frame. The input data frame DA is supplied to the pre-encoder 5. The input data frame comprises the layer nibble LI and the 77 bytes random data RDA shown in FIG. 2. The data frame comprises 14 so called DC-control blocks B0 to B13. The first control block B0 comprises successively: the 10 bit frame sync FS, the 4 bit layer indication LI, a first data block D0 of 31 bits, and a DC-control bit "0" DCC0. The other 13 control blocks B1 to B13 all comprise successively a data block D1 to D13 of 45 bits each and a single DC-control bit DCC1 to DCC13 each. In each control block B0 to B13, the total number of bits is 46. Consequently, the frame comprises in total 644 bits of which the data and the layer indication together comprise 620 bits. The pre-encoder 5 replaces each couple bits by 4 bits (as shown herein above in the table with respect to FIG. 2) and thus doubles the number of bits of a frame at the output of the pre-encoder 5 to obtain a processed frame of 1288 bits. The format of this processed frame is identical to the format of a standard data frame used for the data in the user area DAE outside the BCA 2. Now, the processed frame will be converted by the channel encoder 4 into a channel frame in the same manner as a standard data frame. Consequently, when reading the BCA 2 in a standard player, the channel frames in the BCA 2 can be decoded with the same decoder as used for the standard data frames outside the BCA 2. In this manner, the layer information LI can be easily retrieved. If the data RDA of the frames in the BCA 2 is not random data but meaningful, also this data can be retrieved with the standard decoder.

It should be noted that the above-mentioned embodiments illustrate rather than limit the invention, and that those skilled in the art will be able to design many alternative embodiments without departing from the scope of the appended claims. For example, instead of only data pits, further grooves may be present in the BCA 2, the grooves may be used for tracking. These grooves may be wobbled to indicate a particular position. Blu-ray disks of the re-writable format (BD-RE) and the recordable format (BD-RO) will have a grooved structure in the BCA 2.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An apparatus for reading an optical disk having a burst cutting area comprising markings and data (DA), the apparatus comprising:
an optical pickup unit for scanning the burst cutting area to obtain a read signal (ES) being dependent on both the markings and the data (DA), a frequency spectrum of the read, signal comprising a marking frequency spectrum (MFS) and a data frequency spectrum (DFS), and
a processor for processing the read signal (ES) to retrieve both the data (DA) and the markings by using filters corresponding to the data frequency spectrum (DFS) and the marking frequency spectrum (MFS), respectively, and
a decoder for decoding the data by replacing data sequences with respective decoded data sequences to form output data, the output data at times having more low frequency content than the data sequences.

2. The apparatus for reading an optical disk as claimed in claim 1, wherein the filters comprise a low-pass filter for passing the ground frequency (f0) of the marking frequency spectrum (MFS) and blocking the data frequency spectrum (DFS) to retrieve a marking signal (RMA).

3. The apparatus of claim 1 wherein the decoder at times replaces data sequences 1010, 0001, 0111, and 0101 respectively with data sequences 00, 01, 10, and 11 in the output data.

4. The apparatus of claim 1 wherein the decoder an times replaces data sequence 0000 1000 with data sequence 1010 in the output data.

5. The apparatus of claim 1 wherein the channel decoder is a 1,7 PP decoder.

6. The apparatus of claim 1 wherein the output data includes a layer indication indicating a layer or the optical disc from which the data was read.

7. The apparatus of claim 6 wherein the layer indication is a 4 bit nibble.

8. The apparatus of claim 1 wherein:
the markings have substantially more low frequency components than the data, and
the output data have substantially more low frequency components than the data sequences.

9. Method of reading an optical disk having a burst cutting area comprising markings and data (DA), the method comprising:
scanning the burst cutting area to obtain a read signal (ES) being dependent on both the markings and the data (DA), a frequency spectrum of the read signal comprising a marking frequency spectrum (MFS) and a data frequency spectrum (DFS), and
processing the read signal (ES) to retrieve both the data (DA) and the markings by filtering the data frequency spectrum (DFS) and the marking frequency spectrum (MFS), respectively,
decoding the data by replacing data sequences with decoded data sequences, the decoded data sequences at times having more low frequency content than the data sequences.

10. The method of claim 9 wherein:
the markings have substantially more low frequency components than the data, and
the decoded data sequences have substantially more low frequency components than the data sequences.

11. The method of claim 9 wherein the filtering includes low pass filtering for passing the ground frequency (f0) of the marking frequency spectrum (MFS) and blocking the data frequency spectrum (DFS) to retrieve a marking signal (RMA).

12. The method of claim 9 wherein the decoding at times replaces data sequences 1010, 0001, 0111, and 0101 respectively with data sequences 00, 01, 10, and 11 in the output data.

13. The method of claim 9 wherein the decoding at times replaces data sequence 0000 1000 with data sequence 10 10 in the output data.

14. The method of claim 9 wherein the decoding is 1,7 PP decoding.

15. The method of claim 9 wherein the output data includes a layer indication indicating a layer of the optical disc from which the data was read.

16. The method of claim 15 wherein the layer indication is a 4 bit nibble.

17. An apparatus for reading and writing optical disks, each having a burst cutting area comprising markings and data (DA), the apparatus comprising:

an optical scanning unit for at times scanning the burst cutting area during witting of outgoing data to the burst cutting area, the outgoing data having a data frequency spectrum (DFS), and for at times scanning the burst cutting area to obtain a read signal (ES) being dependent on both the markings and the data (DA), a frequency spectrum of the read signal comprising a marking frequency spectrum (MFS) and the data frequency spectrum (DFS), and a processor for at times processing the read signal (ES) to retrieve both the data (DA) and the markings by using filters corresponding to the data frequency spectrum (DFS) and the marking frequency spectrum (MFS), respectively, and for at times generating the processed data (PD), and an encoder for receiving processed data (PD) to supply the outgoing data (OD) having an outgoing data frequency spectrum (DFS) with suppressed DC-content, and a decoder for decoding the data by replacing data sequences with respective decoded data sequences to form output data, the output data at times having more low frequency content than the data sequences, and wherein the encoder suppresses a low frequency component of the outgoing frequency spectrum (DFS) which would otherwise cause interference with a frequency component of the marking frequency spectrum (MFS) by a selection between alternative output data sequences for identical processed data sequences.

* * * * *